United States Patent Office 3,401,335
Patented Sept. 10, 1968

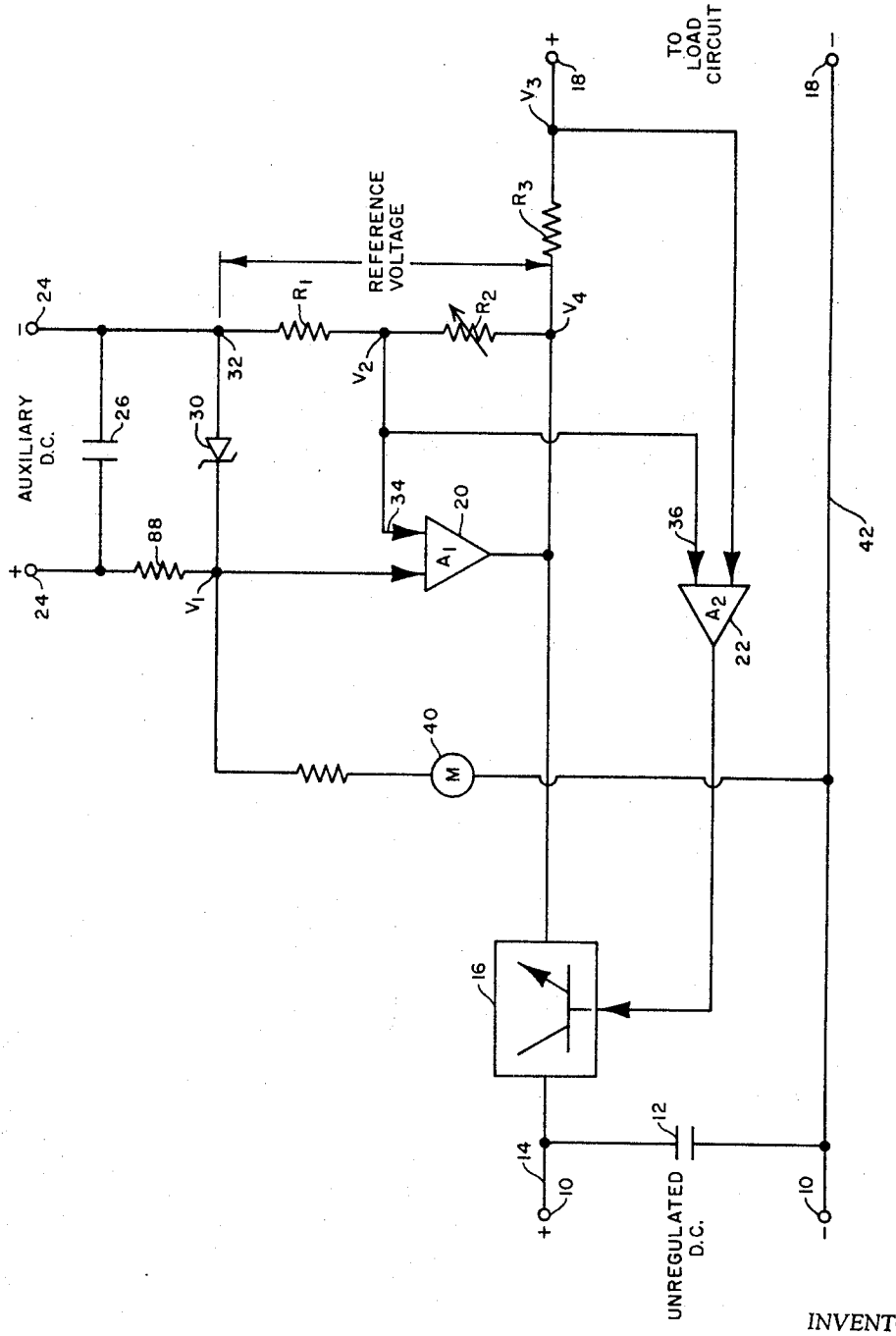

3,401,335
METER CIRCUIT FOR POWER SUPPLY
Joseph C. Perkinson, Stirling, N.J., assignor to Hewlett-Packard Company, a corporation of California
Filed Mar. 18, 1966, Ser. No. 535,583
5 Claims. (Cl. 324—76)

ABSTRACT OF THE DISCLOSURE

An output voltage measuring circuit for a constant current power supply is disclosed wherein a series regulator is controlled by the output of a difference amplifier which senses and compares the voltage across an output current monitoring resistor and the voltage across a programming resistor connected between a fixed resistor and the current monitoring resistor. A second difference amplifier is provided for varying the current through the programming resistor in accordance with the difference between a reference voltage and the voltage across the fixed resistor. The voltmeter is connected between the reference source and a point between the load and the unregulated input.

---

This invention relates to a power supply and, more particularly, to an arrangement that permits a meter to continuously monitor the output voltage of a power supply without creating appreciable loading of the power supply load circuit.

It is often desirable to place a voltmeter across the output terminals of a direct current power supply. This can readily be done by using voltmeters having a relatively high input impedance. Unfortunately, high input impedance voltmeters can be relatively expensive. On the other hand, a low impedance voltmeter tends to shunt the relatively high output impedance of the regulated power supply with its own lower impedance. This not only decreases the power rating of the supply but also in many cases reduces the accuracy of the supply and its ability to maintain a constant regulating current or voltage output.

It is, therefore, an object of this invention to provide a power supply with facility for monitoring its output voltage with a measuring device having a relatively low input impedance.

Another object of this invention is to provide an improved means for metering the output voltage of a power supply.

In a preferred embodiment of this invention an otherwise conventional constant current regulated power supply is provided in which an unregulated direct current input and a series regulator are connected in series with a load circuit. A conventional current monitoring resistor is placed between the series regulator and the load circuit and a reference voltage source is connected between the series regulator and the current monitoring resistor.

A voltage divider including a current programming resistor is serially connected to a summing point between the current monitoring resistor and the series regulator and a reference voltage source. A first comparison amplifier is responsive to the voltage drops across the current programming resistor and the current monitoring resistor and acts to control the series regulator to equalize these two voltages. A second comparison amplifier is responsive to the voltage drops across the current programming resistor and the reference voltage itself and operates to equalize the two voltage inputs by feeding additional current through the current programming resistor.

This arrangement facilitates metering the output voltage of the supply with a low impedance voltmeter. The voltmeter is connected to the reference voltage input of the second comparison amplifier. This point acts as a current source having relatively high output impedance and causes a negligible loading of the power supply.

The novel features that are considered characteristic of this invention are set forth with particularity in the appended claims. The invention, itself, however, both as to its organization and method of operation, as well as additional objects and advantages thereof, will best be understood from the following description when read in connection with the accompanying drawings, in which the sole figure is a partial block and partial schematic diagram of a circuit for measuring the output voltage of a power supply, which circuit is constructed in accordance with a preferred embodiment of this invention.

Referring to the sole figure, a source of unregulated direct current voltage is applied to the input terminals 10. This source may be a conventional rectified voltage derived from an alternating current source, or other suitable source, and is applied across a storage or filtering capacitor 12. The upper bus (in the drawing) 14, which in this instance is illustrated as being positive, is coupled through a series regulator 16, which may be a conventional NPN transistor, through a summing junction $V_4$ and current monitoring resistor $R_3$ to a load circuit which may be connected to output terminals 18.

In accordance with the invention a pair of differential or comparison amplifiers 20 and 22, respectively, are employed and are supplied power by an auxiliary source of direct current voltage available from the terminals 24. This auxiliary source may be derived from a secondary winding on the same transformer for example that supplies the unregulated direct current at the input terminals 10. After suitable rectification the auxiliary direct current is coupled across a filter capacitor 26 and filter resistor 88 to a Zener regulating diode 30 which provides a reference voltage at relatively good stability. Although a Zener diode 30 is illustrated, other suitable devices such as a battery or other constant voltage means of well known type may be employed as desired.

The negative-going terminal 32 of the reference voltage source is connected through a series connected fixed resistor $R_1$ and an adjustable programming resistor $R_2$ to a summing junction designated $V_4$ on the positive bus of the power supply between the series regulator 16 and the current monitoring resistor $R_3$. The current node between the fixed resistor $R_1$ and the current programming resistor $R_2$, which is designated $V_2$, is connected to one input 34 of the first comparison amplifier 20 and to one input of the second comparison amplifier 22. The remaining input of the first comparison amplifier 20 is derived from the node $V_1$ of the reference voltage source. In like manner the remaining input for the second comparison amplifier 22 is derived from the node $V_3$ between the current monitoring resistor $R_3$ and the load circuit, which is the output of the power supply.

With this arrangement, a voltmeter, denoted by the circle 40, may be connected between the negative bus 42 of the power supply and the node point $V_1$. The current available from the node point $V_1$ is from a high impedance current source and varies as a function of the voltage across the load circuit of the supply, i.e., the voltage at node $V_3$. This permits the measurement of the output voltage of the power supply using voltmeters having relatively low input impedance without causing significant loading of the supply.

As is well known, the function of the comparison amplifiers 20 and 22 is to provide a feedback control system which adjusts the output voltage or current of the amplifier in such a direction as to bring the voltage difference between the inputs of that amplifier to zero. In terms of feedback amplifier theory a regulated supply of this type may be considered as a direct current power amplifier in which the input is the reference voltage, $\beta$ is the ratio of the divider resistors $R_1$ and $R_2$, and the line voltage and load changes are disturbances in the $\mu$ circuit. The feedback arrangement acts to suppress these disturbances by the factor $1/(1-\mu\beta)$ where $\mu\beta$ is the loop gain.

In the case at hand, the two comparison amplifiers 20 and 22 act in accordance with the invention firstly to vary the current flowing through the series regulator 16 by action of the second comparison amplifier 22. This causes the voltage at node $V_2$ with respect to the negative bus 42 to equal the voltage at node $V_3$ which is the output voltage of the power supply. In like manner the function of the first comparison amplifier 20 is to cause the voltage at the node point $V_1$ to follow the voltage at the node point $V_2$. This is accomplished by the comparison amplifier 20 supplying the current necessary through the current programming resistor $R_2$ to cause this relationship to exist.

The operation may perhaps be better understood by an illustrative example. Assume, by way of example, that the voltage across the load at the output terminals decreases in magnitude due to some change in load such that the voltage at node $V_3$ with respect to the negative bus 42 decreases. This immediately results in a decrease in the current supplied to the second comparison amplifier 22 from node $V_3$. Through conventional feedback action the conductivity of the series regulator 16 decreases so as to maintain the current supplied to the load at the constant value as determined by the current programming resistor $R_2$. The voltage at node $V_4$ thus decreases as does the voltage at node $V_2$. The current supplied the first current amplifier from node $V_2$ decreases with the result that the first comparison amplifier 20 increases its output current by the amount necessary to restore the current flowing through the resistor $R_1$ to its original value. The feedback action of the first comparison amplifier 20 is such that the voltage drop across the resistor $R_1$ must at all times equal the voltage drop across the Zener diode 30. The voltages at the input terminals of the first comparison amplifier 20 always remain equal.

It thus may be seen that due to the operation of this circuit, the currents at the node $V_1$ from the power supply itself, are: the current through the meter 40, the current derived from the output of the amplifier 20, and the current flowing through the programming resistor $R_2$. The function of the first amplifier 20 is that of holding the current through the programming resistor $R_2$ constant by virtue of the Zener diode 30. This is accomplished by changing the output current from the amplifier 20 in whatever direction and by whatever magnitude is necessary so as to maintain the current through the programming resistor $R_2$ constant. The advantage of this arrangement is that the meter current derived from node $V_1$ does not affect the loading of the power supply to any appreciable extent.

It will be obvious that various modifications may be made in the apparatus and in the manner of operating it. It is intended to cover such modifications and changes as would occur to those skilled in the art, as far as the following claims permit and as far as consistent with the state of the prior art.

What is claimed is:

1. In a constant current power supply having an unregulated direct current input, a regulated direct current output, and a series regulator connected in series between said input and output and with a load circuit, the improvement comprising a circuit for measuring the voltage output, said measuring circuit comprising:

impedance means connected in series between said series regulator and said load circuit for monitoring the current flow in said load circuit, a reference voltage source, a current programming resistor and a second resistor serially connected between said reference voltage source and a point between said series regulator and said impedance means, a first comparison amplifier means responsive to the voltage drops across each of said impedance means and said current programming resistor for varying the current through said series regulator, thereby to equalize said voltage drops, an indicating device serially connected between said reference voltage source and a point between said load circuit and said unregulated direct current input, and a second comparison amplifier means responsive to the voltage drops across each of said reference voltage source and said second resistor for varying the current through said current programming resistor, whereby the current available to said indicating device is related to the voltage drop across said load circuit.

2. The improvement set forth in claim 1 wherein said impedance means is a fixed resistor.

3. The improvement set forth in claim 1 wherein said indicating device is a voltmeter having input impedance less than the output impedance as taken across said direct current output of said power supply.

4. The improvement set forth in claim 1 wherein said reference voltage source includes a Zener diode.

5. The improvement set forth in claim 1 wherein said indicating device is a voltmeter having input impedance less than the output impedance as taken across said direct current output of said power supply, and wherein said reference voltage source includes a Zener diode.

References Cited

UNITED STATES PATENTS 3,201,680    8/1965    Ross et al. _____ 323—9 X
3,370,222    2/1968    Haagen-Smith et al. __ 323—9 X RUDOLPH V. ROLINEC, *Primary Examiner.*

A. E. SMITH, *Assistant Examiner.*